(No Model.) 3 Sheets—Sheet 1.

J. GOSWEILER.
CRANK.

No. 283,099. Patented Aug. 14, 1883.

WITNESSES:
O. W. Reed

INVENTOR
Jacob Gosweiler
BY Josiah H. Macy.
ATTORNEY

N. PETERS, Photo-Lithographer, Washington, D. C.

(No Model.) 3 Sheets—Sheet 3.

J. GOSWEILER.
CRANK.

No. 283,099. Patented Aug. 14, 1883.

WITNESSES:

INVENTOR
Jacob Gosweiler
BY Josiah H. Macy
ATTORNEY

UNITED STATES PATENT OFFICE.

JACOB GOSWEILER, OF CLEVELAND, OHIO.

CRANK.

SPECIFICATION forming part of Letters Patent No. 283,099, dated August 14, 1883.

Application filed July 7, 1883. (No model.)

*To all whom it may concern:*

Be it known that I, JACOB GOSWEILER, a citizen of the Republic of Switzerland, residing in the city of Cleveland and State of Ohio, have invented a new and useful Improvement in Cranks, of which the following is a specification.

My invention consists of a double crank formed of two single ones, secured upon separate shafts or upon two sections of the same shaft, and so constructed and arranged in relation to a crank-pin which is common to both single cranks that an allowance or compensation is afforded in case of any variation (by reason of settling or other cause) of the shaft or a part thereof from its true line, thereby preventing a great increase of friction, a waste of power, and the unnecessary wear of the several parts. I attain these objects by the mechanism illustrated in the accompanying drawings, in which—

Figure 1:
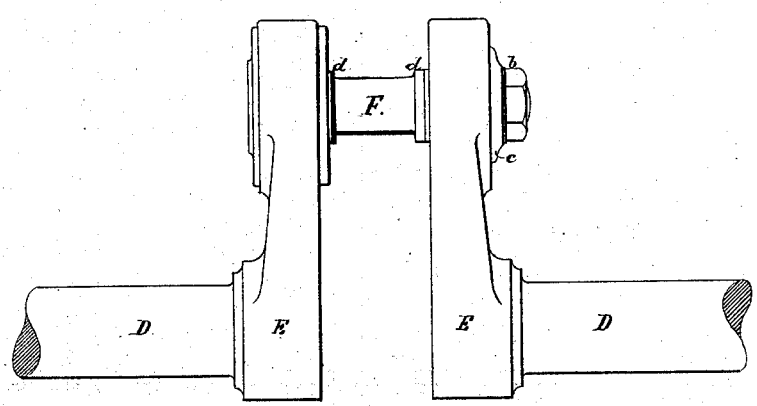
Figure 2:
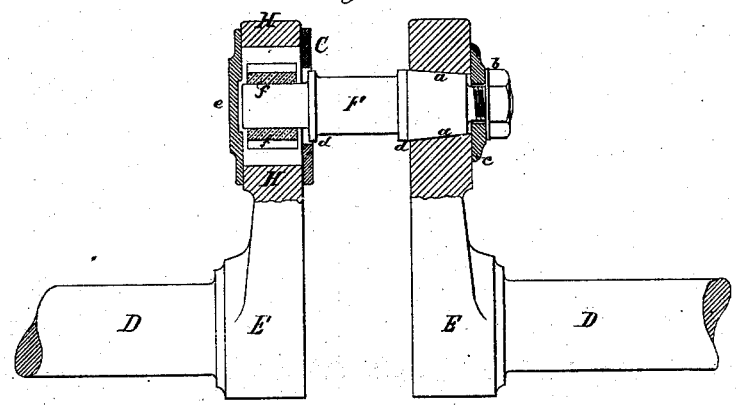
Figure 3:
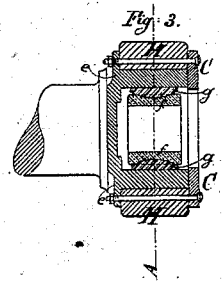
Figure 4:
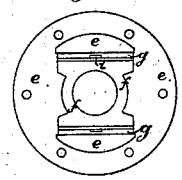
Figure 5:
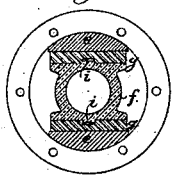
Figure 6:
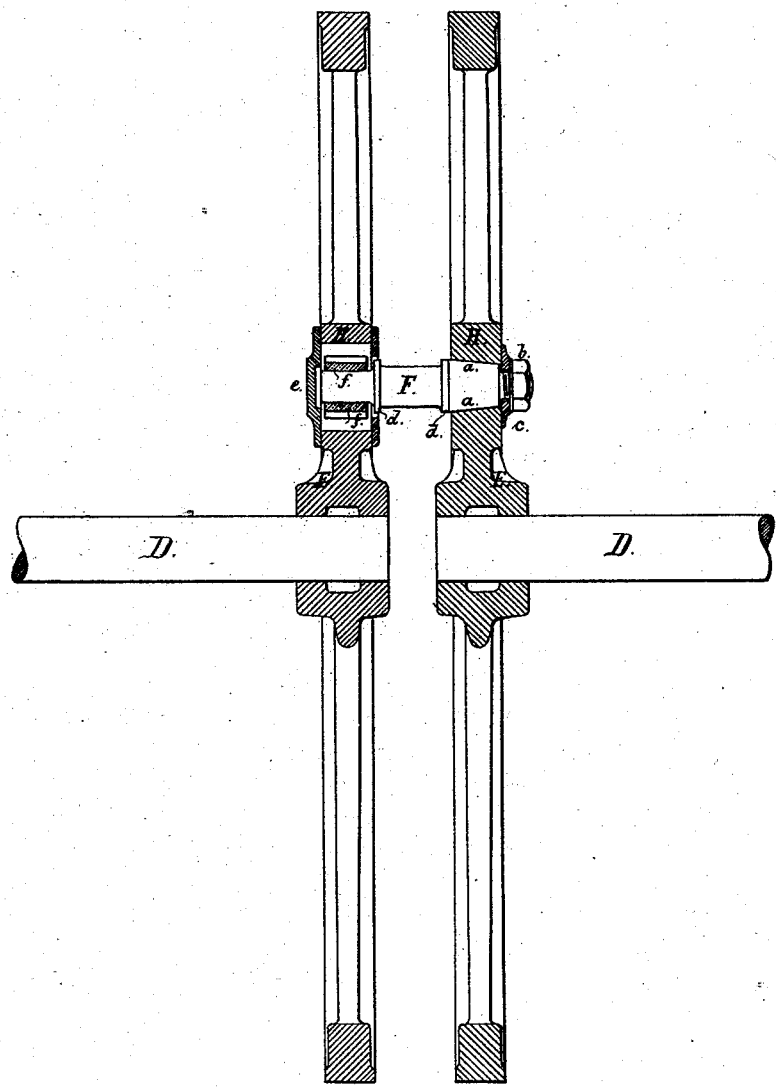
Figure 7:
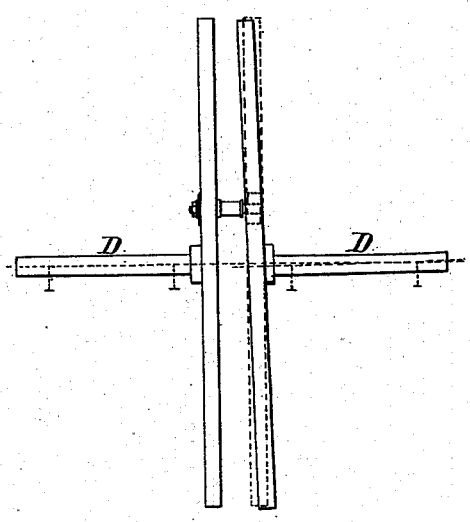
Figure 9:
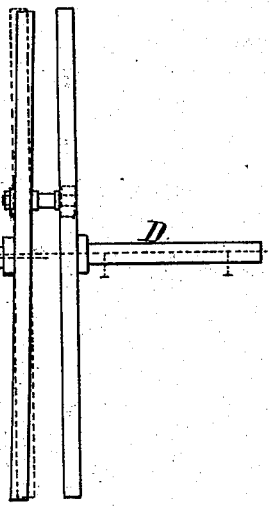
Figure 8:
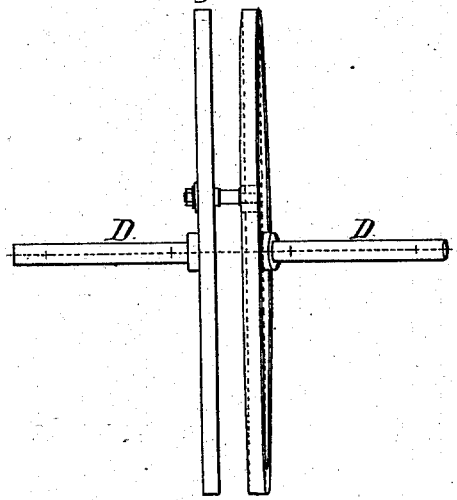
Figure 10:
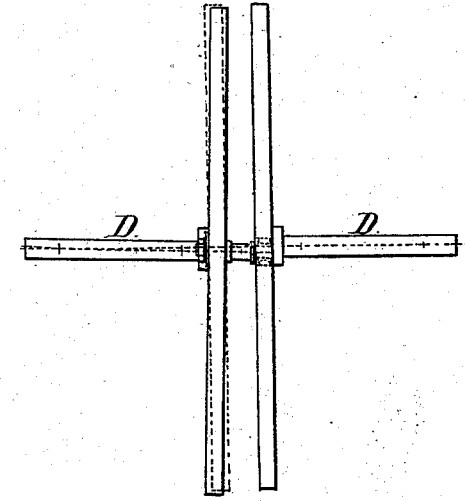

Figure 1 represents two shafts or two sections of the same shaft, each having a single crank, with a crank-pin common to both. Fig. 2 represents the cranks in the same position as seen in Fig. 1, but showing a longitudinal section thereof through the eyes of both cranks, illustrating in part the manner in which the crank-pin is attached to each shaft. Fig. 3 is a cross-section through the eye of the left-hand crank, cut through the said crank, when in the position shown in Fig. 2, horizontally, which shows the bearing-blocks of the crank-pin and the movable or compensating parts of said crank. Fig. 4 represents an end view of the bushing which is placed in the left-hand crank to hold the bearing-blocks of the crank-pin, the bearing-blocks and compensating parts, as seen, looking toward C, Fig. 2, from the right-hand crank, with the crank-pin taken out. Fig. 5 is a cross-section through the line A B of Fig. 3, showing the arms or plates of a bushing which passes through the crank, and which holds the bearing-box and compensating parts used in connection therewith. Fig. 6 shows the application of the invention to two fly-wheels in cross-section. Figs. 7, 8, 9, and 10 represent different possible positions of the wheels and crank-pins, owing to the settling of the shafts or their not being placed in line, showing the advantages of a compensating-pin under such conditions.

In the several figures, D D are the two shafts or the two sections of the same shaft when united by a crank-pin.

E E are the arms which form the single cranks.

F is the crank-pin, one end of which, as at $a$, Fig. 2, is made tapering to fit a corresponding tapering hole in the right-hand crank of Figs. 1 and 2. The pin is made a little large to allow for wearing. Consequently the tapering part of the pin does not extend quite through the crank. It may be drawn tight by means of the nut $b$, the screw-thread on the end of the pin, and the washer $c$, which bears against the side of the crank. It will be observed that the crank-pin at this end is held positively rigid and firm in one arm or crank, and has a shoulder or collar, $d$, on each side of the connecting-rod bearing, to prevent the rod from wearing or coming in contact with the cranks, as well as to prevent a spring or unnecessary vibration of the rod.

H H, Figs. 2 and 3, represent a part of the arm of the left-hand crank which holds the movable or compensating parts.

$e\ e$ is the bushing, which is introduced in the aperture or hole bored in the crank to receive and hold the movable bearing-boxes $f$ and intermediate supports or cheek-pieces, $g$. The bearing-boxes $f$ have, on two exterior surfaces, a spline or feather, $i$, (shown at Fig. 5,) which permits the box to move in and out in the eye of the crank and in line parallel with the shaft, but prevents a separation of the boxes and the cheek-pieces or intermediates. On each side of the spline the boxes $f$ are dished or made concave in form, as shown in Fig. 3, to fit loosely with the convex surfaces of the intermediate supports or cheek-pieces and afford an up-and-down rocking motion to the boxes when in the position shown by Fig. 2. If the spline were made to fit tightly in its recess, this rocking motion could not take place. Consequently due allowance of space is made for this purpose. That side of the cheek-pieces or intermediates which rests or bears against the bushing $e$ is flat, and does not entirely cover the surface of the bushing against which it slides. Therefore it will be observed that when the pin is in place the bearing-box can slide in or out on the spline a short distance, or on the shaft with the cheek-pieces, and that the box and cheek-pieces or intermediates may slide laterally upon the face of the bushing practically at any required angle, while the up-and-down motion is obtained by the rocking or convex and concave surfaces of the box and cheek-pieces combined. Thus I have to all intents and purposes the variable movement of a universal joint in the bearing-block of the crank-pin in this crank, which would prevent undue friction and an excessive wearing of the several parts, except the machine should settle enough to necessitate resetting.

The several compensating parts are securely held in proper position by a washer or ring, C, and the several bolts which pass through the said washer, the body of the crank, and the flange of the bushing e, sufficient allowance being made as regards the size of the opening of the washer to prevent the crank-pin from coming in contact with it in case it should be thrown slightly out of line.

Having fully described my invention, what I desire to claim as new, and secure by Letters Patent of the United States, is—

1. A double crank formed of two single cranks attached to separate shafts or to two sections of the same shaft, when so constructed and arranged in relation to a crank-pin which is common to both cranks that an allowance or compensation is afforded and strain prevented when either of the said shafts or section of a shaft is moved from line, substantially as described.

2. A double crank formed of two single cranks connected by a crank-pin, when the said crank-pin is rigidly attached to one of the single cranks and has a movable bearing within the eye of the other crank, substantially as described.

3. A double crank formed of two single cranks and a crank-pin, when the said crank-pin is made tapering in form at one end, and at that end is secured to a crank by a screw, washer, and nut, and having at the other end a bearing in a movable bearing-box, substantially as described.

4. In a double crank, the combination of two single cranks and a crank-pin with a movable bearing-box and a bushing placed in one of the cranks, an intermediate support placed between the bearing-box and the bushing, which will permit a rocking or sliding motion of the said bearing-box, and a means of securing the parts that are movable from the crank within the eye of the crank, all substantially as described.

5. In a double crank, the combination of two single cranks, a crank-pin, the bushing e, the bearing-box f, the cheek-piece g, washer C, and bolts or screws, substantially as described.

6. In a double crank, the combination of two single cranks, the crank-pin F, washer c, nut b, bushing e, bearing-box f, cheek-pieces or intermediate supports, g, washer C, and bolts, all substantially as described.

In testimony whereof I have hereunto set my hand and seal in the presence of two subscribing witnesses.

JACOB GOSWEILER. [L. S.]

Witnesses:
GEO. C. TRACY,
JOHN RAPFER.